Figure 1:
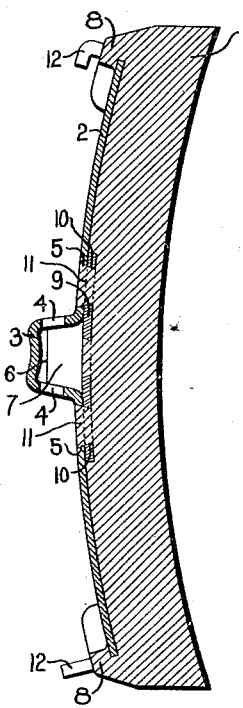

A. G. CAMPBELL.
BRAKE SHOE.
APPLICATION FILED FEB. 12, 1914.

1,122,853.

Patented Dec. 29, 1914.

Witnesses.
J. Morrill Fuller
William E. Gagen

Inventor.
Alfred G. Campbell
by Heard Smith & Tennant.
Att'y's.

UNITED STATES PATENT OFFICE.

ALFRED G. CAMPBELL, OF SHERBROOKE, QUEBEC, CANADA.

BRAKE-SHOE.

1,122,853.  Specification of Letters Patent.  Patented Dec. 29, 1914.

Application filed February 12, 1914. Serial No. 818,384.

*To all whom it may concern:*

Be it known that I, ALFRED G. CAMPBELL, a citizen of the United States, residing at Sherbrooke, Province of Quebec, Dominion of Canada, have invented an Improvement in Brake-Shoes, of which the following description, in connection with the accompanying drawing, is a specification, like characters on the drawing representing like parts.

This invention relates to brake shoes, such as are used on the brake mechanism of railway trains, street cars, etc., and it relates particularly to that type of brake shoe, the body of which is cast to a steel backing plate, the latter being formed to present the key lug through which passes the key that locks the brake shoe to the brake head. It has been found in practice that when the cast metal body of a brake shoe of this nature becomes worn quite thin, it is apt to crack or break transversely through the center opposite the lug because at this particular point the cast metal is not reinforced by the steel backing plate as the latter is bent away from the body to form the lug, and the lug is apt to spread or separate. In order to strengthen the brake shoe at this point, I have provided a bracing or strengthening plate which is preferably situated between the backing plate and the cast metal and which operates to tie together the opposite sides of the lug and also reinforces the cast metal at the point where the backing plate is bent away therefrom to form the lug. I have also provided a novel construction for connecting the brake shoe to the brake head.

I will first describe a selected embodiment of my invention and then point out the novel features thereof in the appended claims.

Figure 2:
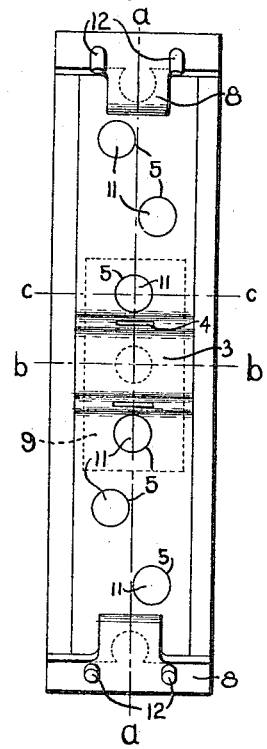
Figure 3:
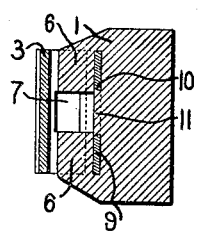
Figure 4:
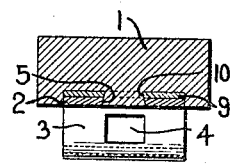

Referring to the drawings, Figure 1 is a longitudinal sectional view of a brake shoe embodying my invention taken on substantially the line *a—a*, Fig. 2; Fig. 2 is a side view of Fig. 1; Fig. 3 is a section on the line *b—b*, Fig. 2; Fig. 4 is a section on the line *c—c*, Fig. 2.

My improved brake shoe comprises the body portion 1 which is made of cast metal and the backing plate 2 usually made of steel or some other suitable sheet metal, said backing plate being bent centrally to form the lug 3 through which passes the key that connects the brake shoe to the brake head, said lug being formed with the key-receiving apertures 4. The backing plate 2 is preferably secured to the body 1 by being cast thereto, said backing plate being placed in the mold in which the body portion 1 is cast so that when said body portion is cast the metal thereof will flow about portions of the plate 2, thus permanently uniting the plate to the body portion. As herein shown, the plate 2 is provided with one or more apertures 5 which are preferably tapered, as shown, the larger end of the apertures being situated on the back side of the plate, so that when the metal is poured into the mold it will run through the apertures, thus firmly interlocking and connecting the plate to the body. Moreover, the mold will preferably be so shaped that the body 1 will have extensions 6 on each side thereof within the lug 3, these extensions being separated from each other to provide the space 7 through which the key passes. Furthermore, the construction may be such that the metal of the casting 1 will flow over the ends of the backing 2, as shown at 8, thereby to more firmly secure the two parts together.

It has heretofore been proposed to construct a brake shoe having the features thus far described. In such a construction the body 1 is reinforced at the back by the plate 2 at all points except at the central point opposite the lug 3, for at this point the material of the plate 2 is bent away from the casting 1 to form the lug. As stated above, when a brake shoe becomes worn very thin it is apt to break at the center opposite the lug, in which case the lug tends to spread, thus rendering the brake shoe incapable of further use, and in fact, more or less dangerous to use.

In accordance with my invention I provide a construction whereby the central portion of the brake shoe opposite the lug is strengthened and reinforced so that it is no more liable to break at this point than at any other point, and I accomplish this end by providing a reinforcing plate 9 which overlies and reinforces the portion of the casting 1 opposite the lug that is not reinforced by the backing 2 and which also ties the sides of the lugs together and prevents the latter from spreading. As herein shown, this reinforcing plate 9 extends some distance either side of the lug 3 and is provided with one or more apertures 10, preferably tapered, which apertures are in line with certain of the apertures 5 of the backing plate 2, so that when the body 1 is cast the metal will flow through the alined apertures 10 and 5, thus firmly and integrally connecting the reinforcing plate to the body 1 and also to the backing plate. The portions 11 of metal which flow into the apertures 5 and 10 constitute in effect rivets which rigidly and unyieldingly tie the parts together to make a rigid structure thereof. With this construction the cast metal body 1 is reinforced throughout its entire extent and is doubly reinforced at the center portion, and further the sides of the lug 3 are tied together so as to obviate any danger of the lugs spreading. In my invention, therefore, the brake shoe is in fact stronger at the center than at any other part, and this is a desideratum because the greatest strain thereon often comes at the center.

In connecting brake shoes of this nature to the brake head it is customary to provide hook-shaped attaching members at the ends of the brake shoe under which the ends of the brake head are received. In my present invention I form these hook-shaped attaching members by pins 12 of bendable material which are anchored in the cast metal body, preferably by being cast therein. These pins are straight in the first instance, as shown at the left in Fig. 1, and after the brake shoe is applied to the brake head they can be bent over into position to engage the end of the brake head, thus locking the brake shoe to the brake head.

Having described my invention, what I claim as new and desire to secure by Letters Patent is:—

1. A brake shoe having a cast metal body portion, a backing plate permanently secured to the body portion and formed centrally to present a lug and a reinforcing plate riveted to the backing plate on opposite sides of the lug and tying together said opposite sides thereby to strengthen the lug and prevent it from spreading.

2. A break shoe having a cast metal body portion, a backing plate overlying the back of the body portion and formed centrally to present a lug, a reinforcing or strengthening plate interposed between the backing plate and the body, and means having an interlocking engagement with both the backing plate and the reinforcing plate on each side of the lug thereby to tie rigidly said two plates together whereby the reinforcing plate will prevent the lug from spreading.

3. A brake shoe having a cast metal body portion and a backing plate formed centrally to present a lug and provided with apertures through which the metal of the body flows as it is cast thereby to connect the backing plate to the body, and a reinforcing plate interposed between the backing plate and the body opposite the lug, said reinforcing plate having apertures alined with those of the backing plate through which the metal of the body flows as it is cast.

In testimony whereof, I have signed my name to this specification, in the presence of two subscribing witnesses.

ALFRED G. CAMPBELL.

Witnesses:
COLIN CAMPBELL,
CLAUDE L. SPOFFORD.

Copies of this patent may be obtained for five cents each, by addressing the "Commissioner of Patents, Washington, D. C."

Correction in Letters Patent No. 1,122,853.

It is hereby certified that in Letters Patent No. 1,122,853, granted December 29, 1914, upon the application of Alfred G. Campbell, of Sherbrooke, Quebec, Canada, for an improvement in "Brake-Shoes," an error appears in the printed specification requiring correction as follows: Page 2, line 45, for the word "break" read *brake;* and that the said Letters Patent should be read with this correction therein that the same may conform to the record of the case in the Patent Office.

Signed and sealed this 19th day of January, A. D., 1915.

[SEAL.] R. F. WHITEHEAD,

*Acting Commissioner of Patents.*